No. 632,069. Patented Aug. 29, 1899.
O. E. SMITH.
RESILIENT TIRE FOR WHEELS.
(Application filed Feb. 18, 1899.)

(No Model.)

Witnesses —
O. W. Bond
John Meyer

Inventor
Oscar. E. Smith

UNITED STATES PATENT OFFICE.

OSCAR E. SMITH, OF CHICAGO, ILLINOIS.

RESILIENT TIRE FOR WHEELS.

SPECIFICATION forming part of Letters Patent No. 632,069, dated August 29, 1899.

Application filed February 18, 1899. Serial No. 706,047. (No model.)

*To all whom it may concern:*

Be it known that I, OSCAR E. SMITH, a citizen of the United States, and a resident of Chicago, in the county of Cook and State of Illinois, have invented certain new and useful Improvements in Resilient Tires for Wheels; and I do hereby declare that the following specification is a full, clear, and exact description of the invention, which will enable others skilled in the art to which it pertains to make and use the same, reference being had to the accompanying drawings, forming a part hereof, in which—

Figure 1:
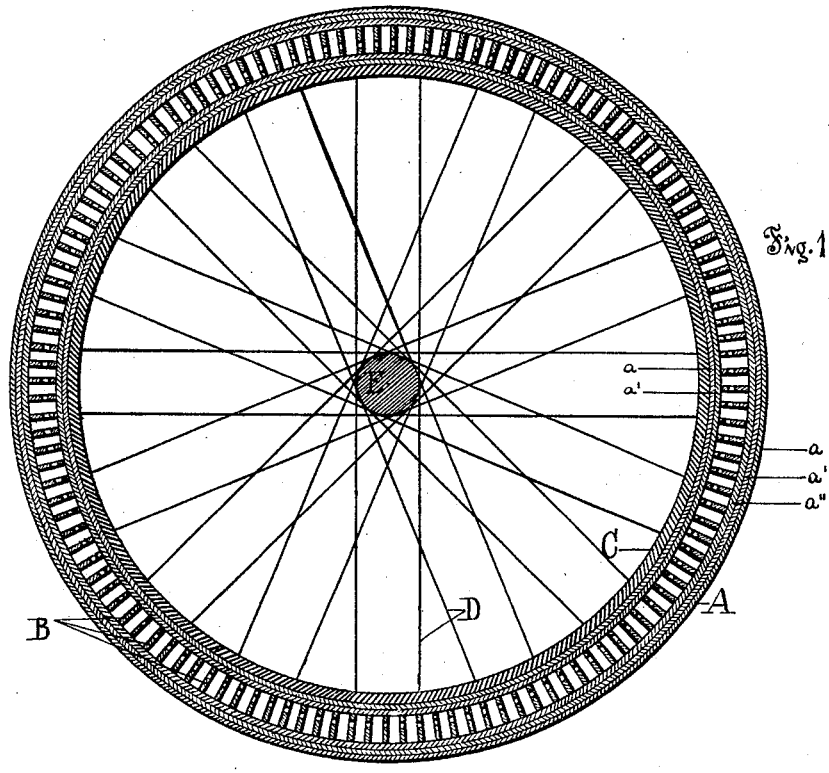
Figure 2:
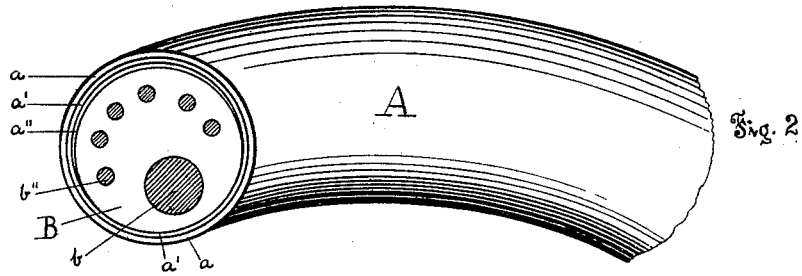
Figure 4:
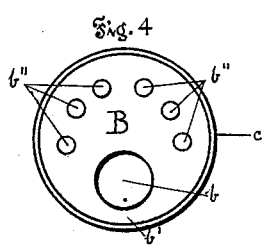
Figure 5:
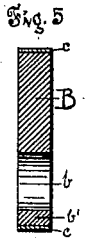
Figure 3:
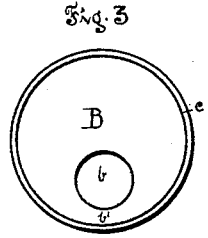

Figure 1 is a sectional elevation of a wheel with the tire applied thereto. Fig. 2 is a detail in perspective of the tire. Fig. 3 is a side elevation of one of the resilient disks. Fig. 4 is a side elevation of a resilient disk, showing a series of perforations or holes in addition to the resilient opening or hole; and Fig. 5, a sectional elevation of the disk of Fig. 3.

Tires for the wheels of bicycles and vehicles are of two general forms, known as "cushion-tires" and "pneumatic tires," the first form consisting of a rubber tube of considerable thickness with a central hole and the second form consisting of an outer rubber casing or tube and an inner tube which is inflated with air to produce the cushion. The cushion-tire of the first form has the advantage of not collapsing or being rendered useless in case of puncture, but is too hard to form a good cushion for easy riding, and the pneumatic tire is open to the objection that it collapses in case of puncture, rendering it useless until repairs are made.

The object of the present invention is to construct a resilient tire for wheels for use on bicycles and vehicles generally possessing all the advantages of the ordinary cushion-tire, of a thick tube of rubber, and likewise all the advantages of a pneumatic tire, without the objectionable features and disadvantages belonging to either class of tires; and to this end the invention broadly consists of a resilient tire formed of an outer tube or casing supported in an expanded condition by means of resilient disks located and secured within the outer casing or tube, in providing a resilient disk formed of a piece of soft rubber having a resilient opening at one side of the center, in providing a wheel having a rim with a concave outer face and a tire formed of an outer tube or casing and a series of interior resilient disks, and in the several parts and combinations of parts hereinafter described, and pointed out in the claims as new.

In the drawings, A represents the outer tube or casing, formed, as shown, of an outer ply or layer of soft rubber $a$ and an intermediate ply or layer $a'$ of a medium grade of hardness of rubber, such intermediate ply or layer having a tread or face to suit the diameter of the tire and its use, and an inner ply or layer $a''$ of a medium grade of hardness of rubber; but the number of plies or layers can be varied so long as the casing or tube form is one adapted and capable of receiving and containing the resilient disks. The tube is to be made continuous in any of the usual and well-known manners.

B are the resilient disks, each formed of a piece of soft rubber and each disk having at one side of the center a hole or opening $b$, constituting the hole or opening by which the requisite resiliency or elasticity is furnished, which hole or opening can be of a diameter to produce the requisite resiliency, such diameter being in proportion to the diameter of the disk and the amount of elasticity desired. The disk shown in Fig. 3 has a solid body, except its resilient hole or opening, and the disk shown in Fig. 4 has a series of holes or perforations $b''$ for the purpose of lightening the disks, and consequently reducing the weight of the tire as a whole. The hole or opening $b$ formed at one side of the center, as shown, leaves a web $b'$, which web increases in width from its center outward in both directions, by which means the elasticity is insured, and in practice the disks are set in the outer tube or casing so that the holes of the disks are on the bottom or inside of the tube, next to the rim of the wheel.

C is the rim of the wheel, made of wood or other suitable material, as usual, to have a concave face to receive the tube or casing of the tire.

D are the spokes of the wheel, and E the hub. The spokes and hub can be of any well-known form of construction and arrangement for the spokes and hubs of bicycles and other wheels.

The disks B are formed by taking a solid roll of soft rubber and cutting the disks therefrom in the thickness required (a quarter of an inch, more or less) to suit the tire, the solid rubber roll having therein a longitudinal hole, which when the disks are cut therefrom forms the hole or opening $b$ of the disk. The roll from which the disks are cut is first vulcanized and then has cemented thereto on its outer face or periphery a single ply of nonvulcanized rubber $c$ and the disk cut therefrom to the required thickness, and such disks are inserted in the outer casing or tube and spaced, as may be required, from three-eighths of an inch, more or less, apart, and when spaced and set the outer casing, with the disks therein, constituting the tire as a whole, is vulcanized in the usual way, firmly uniting the series of disks to the outer tube or casing; but it is to be understood that the disks can be united to the outer tube or casing by cementing or in some other manner, so long as the union is one by which the disks will be retained in place and united firmly to the outer tube or casing. The resilient hole or opening by being located at one side of the center, so as to lie when the disks are in place at the bottom or inside of the tire, prevents the disk from widening in use, as when the tire is placed on the wheel-rim the concave of such rim supports the disk on opposite sides of the resilient hole, thereby permitting of the necessary spread for cushioning purposes and at the same time leaving the tire with its full elasticity, so that in use the tire is elastic and yielding.

A tire formed of the outer casing and the inner resilient disks is secured to the rim in any usual and well-known manner and when in place forms a perfect and uniform cushion for the wheel, and it will be seen that between each disk a space is left, which space is an air-cell, each cell being in a sense independent of the other, but all the cells uniting to form a complete whole. This forming of an air-cell between each disk adds to the elasticity of the tire without affecting its durability, as in case of a puncture passing through the outer tube or casing such puncture will do no harm, because the action will be simply to exhaust and draw in air through the puncture without producing any collapsing of the tire, for the reason that the tire as a whole is supported and maintained in an expanded condition by the resiliency of the disks and the disks are in no manner affected by the puncture. This effect is had by reason that the flattening or inward pressure on the outer surface of the tire simply acts to force the air out through the puncture, thereby to that extent exhausting the air in the particular cell which communicates with the puncture, but not affecting to any appreciable degree the adjoining air-cells, and with the return of the tire to its normal expanded condition the action will be a sucking in of the air, so that in effect the tire acts as a self-pump, simply exhausting and restoring air to the cell having a puncture without changing to the least possible extent the actual working condition of the tire as a whole, which remains expanded and retains its full resiliency and elasticity.

It will thus be seen that the tire embodies the feature of being non-susceptible to the effects of a puncture and likewise has the full resiliency and elasticity found in a pneumatic tire without the defects of the pneumatic tire, and such result is broadly had by the employment of the resilient disks, with their resilient holes at one side of the center, which feature constitutes the essential feature of the present invention, in connection with the employment of such disks in a tire for use on wheels, it being understood that the resilient disks are to be made of soft rubber or other suitable elastic material.

What I claim as new, and desire to secure by Letters Patent, is—

1. In a wheel-tire, the combination of an outer tube or casing and a series of resilient disks secured within the outer tube or casing out of contact with each other and each provided with a relatively large hole at or near its bottom portion, substantially as described.

2. In a wheel-tire, the combination of an outer tube or casing and a series of soft rubber disks within the outer tube or casing and vulcanized thereto out of contact with each other and each provided with a relatively large hole at or near its bottom portion, substantially as described.

OSCAR E. SMITH.

Witnesses:
O. W. BOND,
JOHN MEYER.